United States Patent
Giesler (10) Patent No.: US 8,922,048 B2
(45) Date of Patent: Dec. 30, 2014

(54) PV SUB-GENERATOR JUNCTION BOX, PV GENERATOR JUNCTION BOX, AND PV INVERTER FOR A PV SYSTEM, AND PV SYSTEM

(75) Inventor: Bodo Giesler, München (DE)

(73) Assignee: SMA Solar Technology AG, Niestetal (DE)

( * ) Notice: Subject to any disclaimer, the term of this patent is extended or adjusted under 35 U.S.C. 154(b) by 1029 days.

(21) Appl. No.: 12/867,227

(22) PCT Filed: Feb. 11, 2009

(86) PCT No.: PCT/EP2009/051546
§ 371 (c)(1),
(2), (4) Date: Oct. 13, 2010

(87) PCT Pub. No.: WO2009/101096
PCT Pub. Date: Aug. 20, 2009

(65) Prior Publication Data
US 2011/0031814 A1    Feb. 10, 2011

(30) Foreign Application Priority Data
Feb. 11, 2008    (DE) .................... 10 2008 008 503

(51) Int. Cl.
*H02J 3/34*    (2006.01)
*H02J 13/00*    (2006.01)
*H02J 3/38*    (2006.01)
*H04B 3/54*    (2006.01)

(52) U.S. Cl.
CPC ............ *H02J 13/0082* (2013.01); *H02J 3/383* (2013.01); *Y02E 10/563* (2013.01);
(Continued)

(58) Field of Classification Search
USPC ............ 307/3, 78, 76, 83, 2; 702/88, 182, 64; 320/101, 107, 103, 104, 109; 323/299
See application file for complete search history.

(56) References Cited

U.S. PATENT DOCUMENTS 8,204,709 B2 *    6/2012    Presher et al. .................. 702/88
2004/0167676 A1    8/2004    Mizumaki
(Continued)

FOREIGN PATENT DOCUMENTS

DE    198 59 732        6/2000
DE    60 2004 011 201    12/2008
(Continued)

OTHER PUBLICATIONS

SMA "Sunny String Monitor—Cabinet (SSM-C): Installation and Use of SSM-C"; Technical Description, Version 1.0, SSMC-TEN072310; 98-4000210; SMA Solar Technologies, 2005, p. 1-61.

*Primary Examiner* — Rexford Barnie
*Assistant Examiner* — Jagdeep Dhillon
(74) *Attorney, Agent, or Firm* — Eschweiler & Associates, LLC (57) ABSTRACT

A photovoltaic (PV) sub-generator junction box (1) for a PV system (100) comprises a plurality of electric terminals (11) for optionally connecting one respective PV string (2) of one or more serially connected PV modules (3). Said PV sub-generator junction box (1) further comprises a sub-generator line terminal (12) for connecting a PV sub-generator line (4) of a remote central PV inverter (5) or connecting a PV sub-generator line (4) of an inserted PV generator junction box (6). The PV sub-generator junction box (1) also comprises an electronic control unit (10) that is connected to a central control unit (7) of the PV inverter (5) in order to exchange data (DAT0). According to the invention, the PV sub-generator junction box (1) comprises a power line modem (8) for feeding and retrieving the data (DAT) via the PV sub-generator line (4).

10 Claims, 6 Drawing Sheets (52) U.S. Cl.
CPC ............ *Y02E 60/7815* (2013.01); *Y04S 10/123* (2013.01); *Y04S 40/121* (2013.01); *H04B 3/54* (2013.01); *H04B 2203/5416* (2013.01); *Y04S 40/146* (2013.01); *Y02E 60/7892* (2013.01); *Y02E 40/72* (2013.01)
USPC ................ 307/3; 307/77; 307/104; 307/10.1; 307/140; 307/82; 702/182; 702/64; 702/188; 320/101; 320/107; 320/103; 320/104; 320/109; 323/299

(56) References Cited

U.S. PATENT DOCUMENTS

| | | |
|---|---|---|
| 2006/0162772 A1 | 7/2006 | Presher, Jr. et al. |
| 2006/0237058 A1 | 10/2006 | McClintock et al. |
| 2007/0019613 A1 | 1/2007 | Frezzolini |
| 2007/0252716 A1 | 11/2007 | Burger |
| 2008/0147335 A1* | 6/2008 | Adest et al. ................ 702/64 |

FOREIGN PATENT DOCUMENTS

| | | |
|---|---|---|
| EP | 1609250 B1 | 1/2008 |
| WO | 0193452 A1 | 12/2001 |
| WO | WO 02/093655 | 11/2002 |
| WO | WO 03/071655 | 8/2003 |
| WO | WO 2005/117245 | 12/2005 |

\* cited by examiner

PV SUB-GENERATOR JUNCTION BOX, PV GENERATOR JUNCTION BOX, AND PV INVERTER FOR A PV SYSTEM, AND PV SYSTEM

CROSS-REFERENCE TO RELATED APPLICATIONS

This is a U.S. national stage of International Application No. PCT/EP2009/051546, filed on 11 Feb. 2009. Priority is claimed on German Application No. 10 2008 008 503.0, filed on 11 Feb. 2008. The entire content of both applications are incorporated herein by reference.

BACKGROUND OF THE INVENTION

1. Field of the Invention

The invention relates to a PV sub-generator junction box for a photo voltaic (PV) system comprising a plurality of electrical connections for connection to a PV string of one or more PV modules connected in series. The PV sub-generator junction box comprises a sub-generator line terminal for connecting a PV sub-generator line of a remote central PV inverter or for connecting a PV sub-generator line of an intermediate PV generator junction box. The PV sub-generator junction box further comprises an electronic control unit which is connected by a data link to a central control unit of the remote control PV inverter for exchange of data.

The invention further relates to a PV generator junction box having a plurality of sub-generator line terminals for connection to a respective PV sub-generator line of a PV sub-generator junction box. The PV generator junction box includes a main line terminal for connecting a PV main DC voltage line of a remote central PV inverter. The PV generator junction box features at least one main circuit breaker for disconnecting the PV main DC voltage line and/or at least one group circuit breaker for disconnecting the respective PV sub-generator line.

The invention further relates to a PV inverter for a PV system which features at least one sub-generator line terminal for connection to a respective PV sub-generator line or a plurality of PV sub-generator lines and/or for connecting a respective PV main DC voltage line of an intermediate PV generator junction box. The PV inverter features a grid connection for connecting the PV inverter to a power supply network. The PV inverter also features a central control unit for controlling the PV inverter as well as for transmitting data to the plurality of PV sub-generator junction boxes linked to the central control unit via a data link.

Moreover, the invention relates to a PV system with at least one such central PV inverter and with a plurality of such PV sub-generator junction boxes.

2. Description of the Related Art

International patent application WO 02/093655 A1 discloses a photovoltaic system having a plurality of solar modules and a central inverter for feeding power into a public power grid. The solar modules each feature an integrated high-frequency energy transmitter, each of which can be electromagnetically coupled to a high-frequency energy receiver, i.e., on transformational paths. The energy transmitter and the energy receiver are preferably a primary-side and a secondary-side pot coil, able to be coupled over an air gap. The inverter has one or more power cables on which the energy receivers are arranged distributed along the power cable. The energy receivers feed in parallel into the power cable with a DC voltage if a solar module with an energy transmitter is connected to these modules. For voltage regulation of the DC voltage present on the power cable the inverter has a measurement device and a control device, with the voltage being regulated by corresponding activation of an H bridge of the inverter. The inverter also includes a circuit for data communication for receiving data over the power cable. In addition, the photovoltaic system disclosed in WO 02/093655 A1 includes a data bus for data transport. Here, the data transmission can be based on high-frequency electromagnetic coupling. Data is transported between the energy transmitters and the energy receivers.

Figure 3:
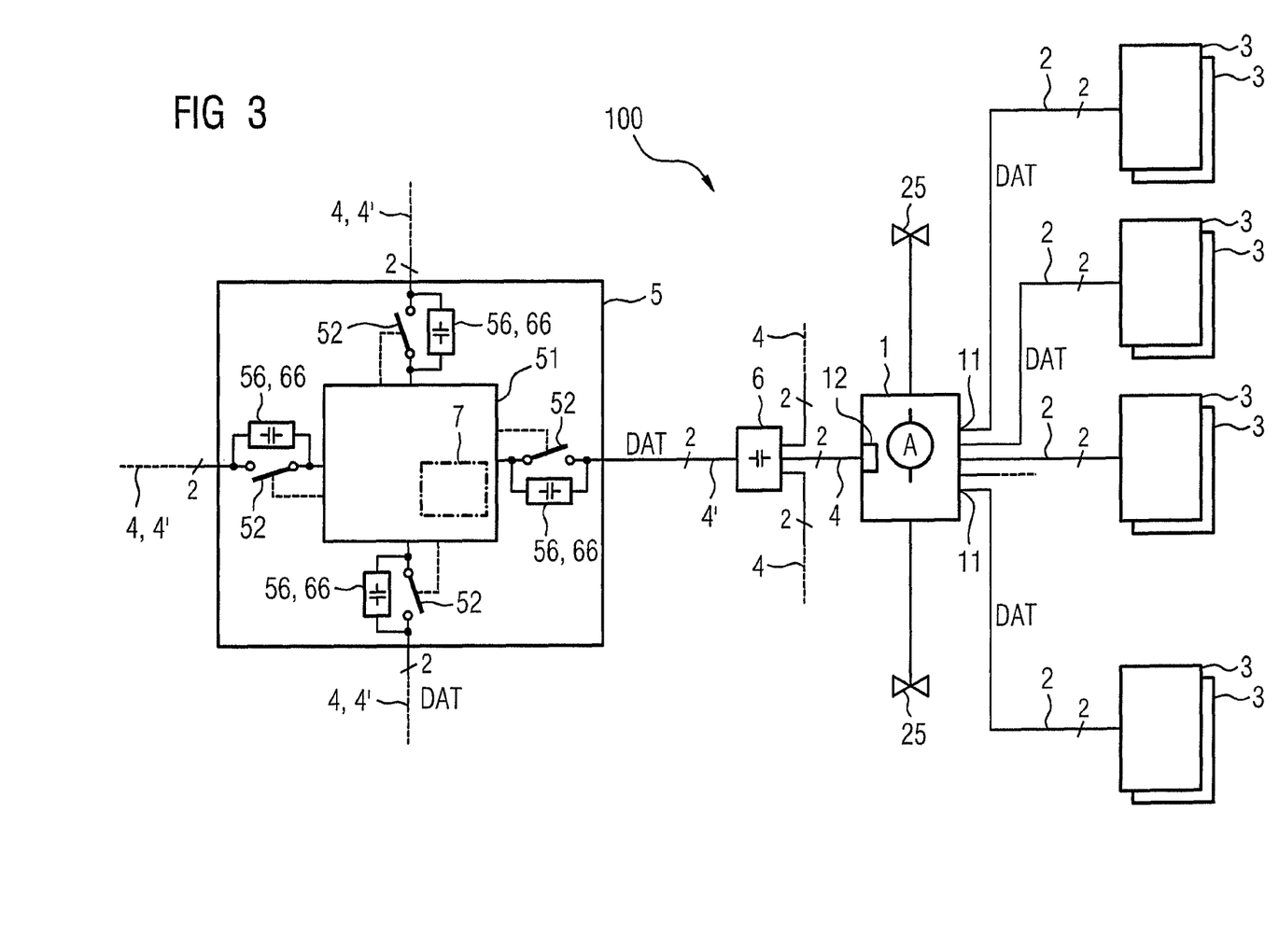
FIG. 3 is an illustration of an exemplary PV system in accordance with the invention.

US 2004/0167676 A1 discloses a method and a device for controlling and managing current generators. Here, the device sends a request over the Internet to the respective current generator as to how much electrical power these are currently generating and feeding into the power supply network. The respective current generators return an appropriate power figure over the Internet. FIG. 3 of US 2004/0167676 discloses a current generator which has a first power line modem. Here, the current generator is plugged by a conventional power grid cable into a socket for electrical feed into a public power grid. The socket and a second power line modem connected to the Internet are installed in a house or the like. The second power line forwards requests received over the Internet to the first power line modem and returns power information obtained to the requesting device.

German publication DE 198 59 732 A1 discloses a method for data transmission between a photovoltaic system with at least one solar module and with a central unit. Here, the central unit can be located in a meter box, for example. The data is transmitted between the at least one solar module and a central unit alternately with the energy generated by the at least one solar module. In the disclosed photovoltaic system, the inverters are already integrated into the solar module. As a result, the respective solar module can be connected directly to the public power supply network. Here, data is only transmitted between the respective inverters and the central unit if the power feed has been interrupted beforehand by operating a switch. By addressing the solar modules, the respective operating data of the solar modules can be interrogated by a computer.

Figure 5:
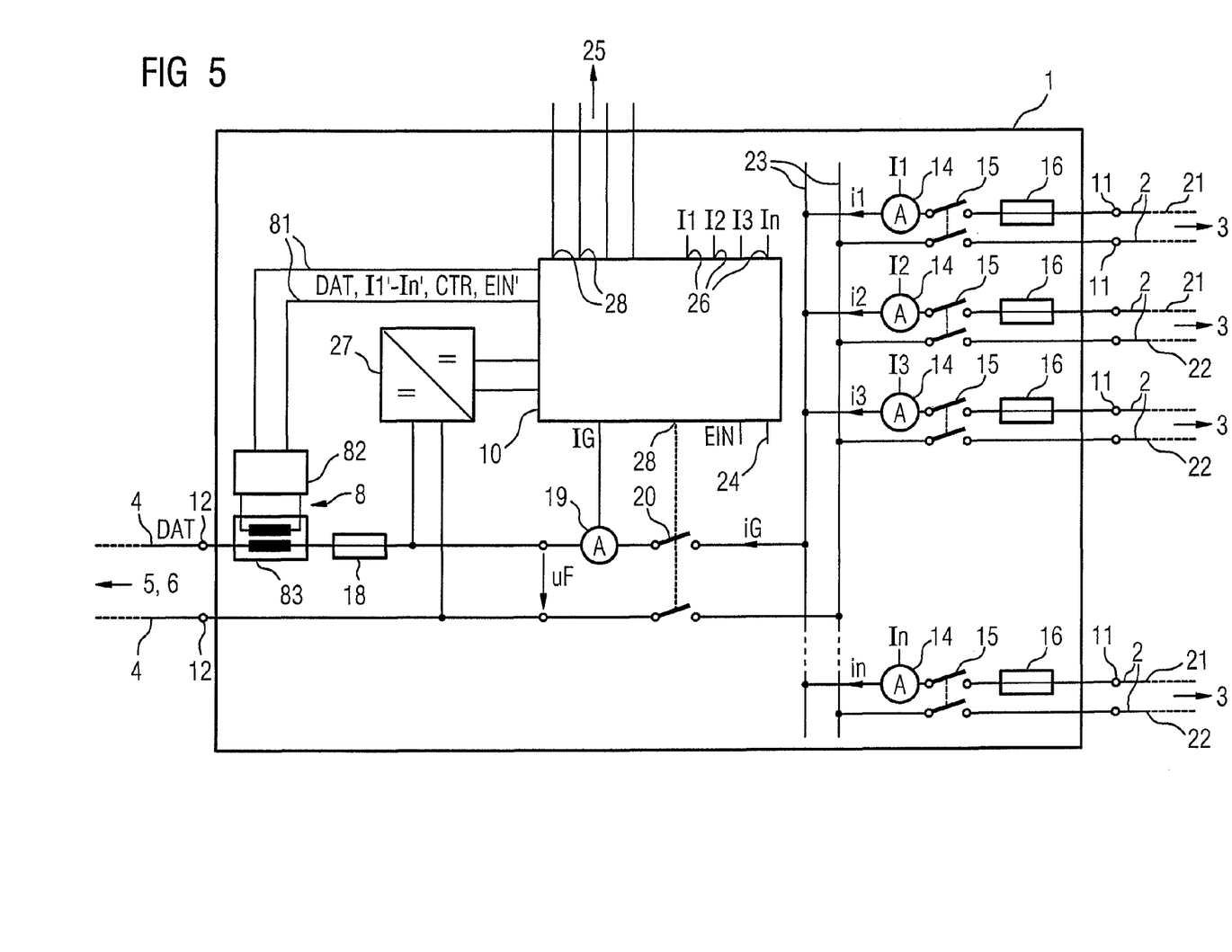
FIG. 5 is an illustration of an exemplary Peavey sub-generator junction box in accordance with the invention.

International patent application WO 03/071655 A1 discloses that local energy generating systems, such as PV systems, multiply feed into a high-voltage energy supply network in parallel over a local network and a low voltage local network transformer. Here, the energy generation system includes a load breaker on its load side by which the respective energy supply system can be disconnected from the local network. To monitor the local energy supply systems for overload states or network faults, WO 03/071655 explains that the amplitudes and the frequency of the chained low voltages are measured on the three-phase low-voltage side of the local network transformer. The measured values that are determined are transmitted as digitally-coded data signals over the local network to all energy generation systems. On the load side, the amplitude and the frequency of the three-phase output voltage are likewise measured and compared with the measured values transmitted over the local network as data signals. FIG. 5 of this publication discloses a measurement receiver for receiving measurement data by a power line modem over the three-phase local network of a public power grid. The measurement receiver is connected on the network side to an inverter of the respective energy generation system.

Known photo voltaic PV systems or also solar arrays mostly comprise a central PV inverter and a plurality of series-connected PV modules. Typically around 10 to 20 PV modules are connected in series into a PV string to achieve a useful array voltage for the PV inverter of around 1,000 V. The PV inverter converts the input DC voltage into a single-phase grid voltage, preferably into a three-phase grid voltage for feeding into the power supply grid.

To minimize power losses the PV inverter is typically arranged in the center of the PV system. The PV modules are preferably arranged in the shape of a star around the PV inverter. There can also be a number of PV inverters. With PV systems with a maximum feed-in power of more than 100 KW, especially of more than 1 MW, there is a plurality of PV sub-generator junction boxes which, on the one hand, are each connected through a PV sub-generator line to the central PV inverter and which, on the other hand, are each connected to a plurality of PV modules connected in series into a PV string. Typically a few strings of PV modules, such as eight, are connected to a PV sub-generator junction box.

With especially large PV systems having an electrical feed power of several Megawatts, further PV generator junction boxes can be connected between the many PV sub-generator junction boxes and the central PV generator junction box. A number of PV sub-generator junction boxes can branch off from such a PV generator junction box. The number of PV sub-generator junction boxes typically ranges between 16 and 100.

A PV sub-generator junction box includes a plurality of electrical terminals for connecting the many PV string lines. The ends of the respective PV string lines can be placed on and attached to the terminals. Furthermore, the PV sub-generator junction box typically features a sub-generator line terminal for connecting a PV sub-generator line having a cable diameter which is a multiple thicker than the cable diameter of a PV string line.

Also known from the prior art are PV sub-generator junction boxes featuring an electronic control unit, i.e., a current detection and monitoring unit. Such control units typically feature a processor or microcontroller to transfer locally-recorded data, such as string current measurement values, array voltage measurement values, temperature measurement values or switching or auxiliary contact signals, to a central control unit of the PV inverter for higher-level open-loop and closed-loop control. In the reverse direction of the respective control unit, a PV sub-generator junction box can receive control data from the central control unit of the PV inverter in order, for example, to be able to activate actuators for solar adjustment of the PV modules or switching means, such as contactors.

The plurality of PV sub-generator junction boxes results in a plurality of signal or data lines, i.e., a plurality of bus lines having to be routed from the central PV inverter to the respective PV sub-generator junction box. It is frequently the case that the signal or data lines usually laid jointly with the PV sub-generator lines in a cable duct demand significantly more space than the PV sub-generator lines themselves. Laying the cables for such a PV system is accordingly cost-intensive, tedious and complex.

A known solution to this problem is to provide a wireless data connection, i.e., between the central PV inverter and the respective PV sub-generator junction box. Because of the screening effect of the PV modules, such data connections are extremely uncertain.

SUMMARY OF THE INVENTION

It is therefore an object of the invention to provide a PV sub-generator junction box, a PV generator junction box and a PV inverter which make possible a significantly lower outlay for laying cables while at the same time providing secure data transmission.

A further object of the invention is to provide a corresponding PV system.

These and other objects and advantages are achieved by a photovoltaic (PV) sub-generator junction box that features a power line modem for feeding and retrieving the data via the PV sub-generator line.

At the heart of the invention is the transmission of the data from the central PV inverter to the respective PV sub-generator junction boxes over the existing PV sub-generator lines which connect the PV sub-generator junction boxes to the central PV inverter for power transmission.

The particular advantage is that this allows elimination of a separate data line or bus line from the respective PV sub-generator junction box to the central inverter.

The power line modem involves a carrier frequency system (TFA) by which the data is modulated in both directions on a power line. The feeding and retrieving of the data can be undertaken using capacitive methods, such as by a capacitor. As an alternative, feeding and retrieving of data can be undertaken using inductive methods, such as by a transformer, or resistive methods, such as by a resistor changing its resistance value. The frequency used for transmission typically lies in a range of between 1 MHz and 30 MHz. The transmission frequency, in particular cases such as PV systems covering a small surface area, can also be above this, such as 433 MHz. Here, the data rate available can amount to several Megabits.

Preferably, each PV sub-generator junction box is able to be addressed using an individual bus address by the central control unit of the PV inverter. Preferably, the central control unit assumes a master function for coordinating the higher-level bidirectional data transmission.

In accordance with an embodiment, the power line modem and the control unit are connected to each other over a bus connection.

Here, data connection between the power line modem and the control unit can be a serial or a parallel interface, for example. In the simplest case, data communication is undertaken through a Serial Port Interface (SPI) of the control unit of the PV sub-generator junction box. The control unit is especially a microcontroller or a microprocessor.

In accordance with an advantageous embodiment, the PV sub-generator junction box has at least one current measurement unit for measuring a respective string current and/or a collective string current. The data able to be transmitted to the central control unit of the PV inverter by the power line modem contains corresponding current measurement data.

An advantage associated with the current embodiment is that all string currents of the plurality of PV modules connected in series can be detected by the central control unit of the PV inverter. As a result, an improved higher-level control and monitoring of the PV system is possible. The inventive PV sub-generator junction box can, as an alternative or in addition, also feature only one current measurement unit for measuring the collective string current. Preferably, the PV sub-generator junction box features a current measurement unit in each case, such as a bar-type current transformer, for detecting any respective string currents.

In accordance with a further embodiment, the electronic control unit features at least one electrical input for detection of the input signal. The data able to be transmitted to the central control unit of the PV inverter contains corresponding input data. The input data can contain binary data or digitally-encoded analog data, which describe different internal and/or external switching or operating states of the control unit of the PV sub-generator junction box. The input data can further include acknowledgement signals from auxiliary contacts of switching contactors of the PV sub-generator junction box.

In accordance with a further embodiment, the electronic control unit features at least one electrical output for at least activating a switching device of the PV sub-generator junction box and/or of actuators for the connected PV modules. The data received by the central control unit of the PV inverter by the power line modem comprises data corresponding to this.

This enables a switching device, such as circuit breakers or contactors in the PV sub-generator junction box, to be switched on or switched off by a control unit of the PV sub-generator junction box and/or by the central control unit of the PV inverter. The actuators can, for example, be "trackers" or "movers". These actuators are used to adjust the PV modules in accordance with the respective position of the sun.

The object of the invention is further achieved by a PV generator junction box for a PV system. This involves a junction box with large dimensions or a switching cabinet. Here, the plurality of PV sub-generator lines originating from the respective PV sub-generator junction boxes are connected together in parallel. On the output side the PV generator junction box is connected by a PV main DC power line to the central PV inverter. The PV generator junction box can have a separate collective circuit breaker for each PV sub-generator line routed into the PV generator junction box to be able to switch off a faulty PV sub-generator junction box. The PV generator junction box, as an alternative or in addition, can have a main circuit breaker in order to disconnect all PV sub-generator junction boxes connected to the PV generator junction box from the central PV inverter.

Moreover, a data signal coupler is connected in parallel to the respective circuit breaker so that data which is fed in by a power line modem into the respective PV sub-generator lines and into the PV main PC power line can be forwarded, even in the open state of the respective circuit breaker.

In the simplest case, the data signal coupler is a capacitor which lets the high frequency data signals pass in both directions. For the high-voltage DC array voltage with the frequency 0 Hz the capacitor represents a block.

The advantage associated with this is that a secure disconnection of the PV sub-generator lines and/or the PV main DC power line from the central PV inverter and simultaneously a continued secure data transmission past the opened circuit breakers is guaranteed.

The object of the invention is further achieved by a PV inverter for a PV system. In accordance with the invention, the PV inverter has at least one power line modem for feeding and retrieving the data by the PV sub-generator lines and/or by the PV main DC power lines.

As a result, communication to the higher level open-loop and closed-loop control of the PV system is possible.

In accordance with an embodiment, the at least one power line modem and the central control unit are connected to each other over a bus connection. The bus connection can, for example, be a serial or parallel interface.

In accordance with a particular embodiment, the PV inverter has at least one circuit breaker device for switching off the PV sub-generator lines and/or the PV main DC power lines. A data signal coupler is connected in parallel to the respective circuit breaker device, so that data, which has been fed in by at least one power line modem into the respective PV sub-generator lines and/or in the PV main DC power line, can be forwarded even in the open state of the respective circuit breaker means.

Typically, a central PV inverter, i.e., with a power range of several hundred kW, has a number of circuit breakers for switching off one or more PV main DC power lines. Consequently, if the solar feed is insufficient, i.e., in the evenings and at nights, the power part of the PV inverter is able to be disconnected from the PV modules. Typically, the power part of the PV inverter is switched off if the consumption of the PV inverter is greater than the electrical power fed in.

Here, the data couplers make it possible for a secure data communication from the central control unit of the PV inverter still in operation to the respective control units of the PV sub-generator junction boxes. This, for example, makes possible anti-theft monitoring of the PV modules which are monitored by the respective PV sub-generator junction boxes.

The object of the invention is further achieved by a PV system with at least one central PV inverter and with a plurality of inventive PV sub-generator junction boxes.

The special advantage is that, in comparison to known PV systems, a significantly lower number of lines from the central PV inverter to the respective PV sub-generator junction boxes must be laid. The cross-section of the cable ducts necessary for laying the lines can have less than half the cross-section by comparison with conventional cable ducts. A further large advantage is the significantly reduced installation outlay for laying the lines. Over and above this, only a fraction of the installation and material costs for laying the lines are incurred.

In accordance with an advantageous embodiment of the PV system, at least one PV generator junction box is provided and connected between the at least one central PV inverter and the plurality of PV sub-generator junction boxes. This allows even large-area PV systems with a plurality of PV generator junction boxes and with a plurality of PV sub-generator junction boxes connected thereto to be realized, with the respective PV sub-generator junction boxes able to be reached for data communication through the central control unit of the PV inverter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION TO THE DRAWINGS

The invention as well as advantageous embodiments of the invention will be described below with reference to the subsequent figures, in which.

DETAILED DESCRIPTION OF THE PREFERRED EMBODIMENTS

Figure 1:
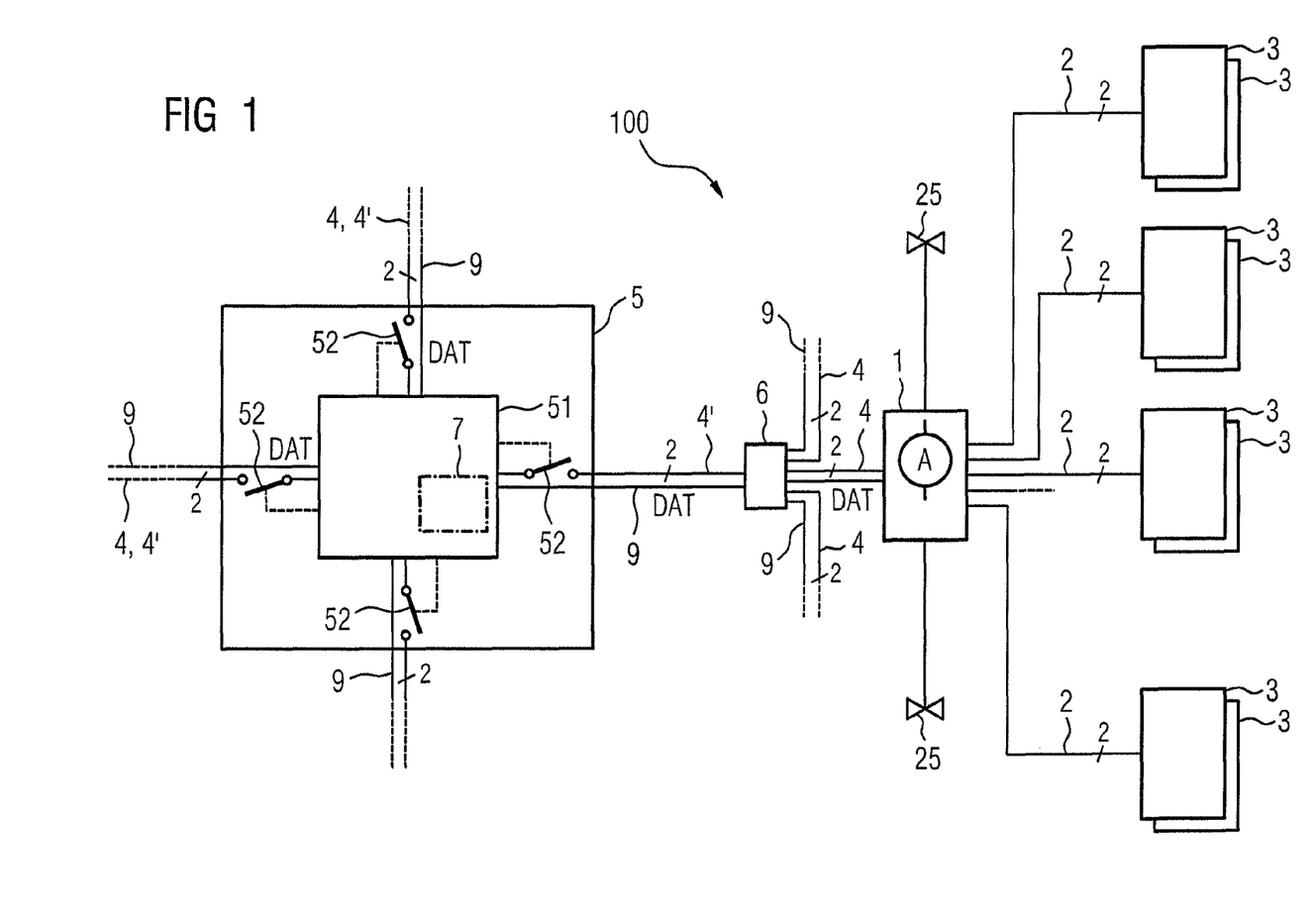
FIG. 1 is an illustration of PV system, in accordance with the prior art.

FIG. 1 shows a prior-art PV system 100. Shown in the left-hand part of FIG. 1 is a PV inverter labeled with the reference designator 5. Shown extending from the PV inverter 5 are typically four PV sub-generator lines 4 or four PV main DC power lines 4'. The mark across the PV sub-generator lines 4 or the PV main DC power lines 4' identified by numeral 2 indicates that the line is preferably a two-wire line. The respective PV sub-generator lines 4 or PV main DC power lines 4' can be disconnected by a controllable circuit breaker device 52 from a power section 51 of the PV inverter 5. Activation is preferably by a central control unit 7. In parallel to each of four PV sub-generator lines 4 or PV main DC power lines 4' in each case is a communication line 9 for bidirectional transmission of data DAT between the central PV inverter 5 and the respective PV sub-generator junction box 1 shown in the right-hand part of FIG. 1.

The central part of FIG. 1 typically shows a PV generator junction box 6 which, in relation to the solar feed power, is connected on the input side to three PV sub-generator junction boxes 1 and on the output side to the central PV inverter 5. In the example depicted here in FIG. 1, only one PV sub-generator junction box 1 and only one PV generator junction box 6 are shown for reasons of clarity. For smaller PV systems 100 a PV generator junction box 6 is not necessarily required. In this case, the respective PV sub-generator junction box 1 is connected by a PV sub-generator line directly to the PV inverter. As FIG. 1 also shows, the communication lines 9, likewise in the event of a PV generator junction box 6 being present, are further distributed to the respective PV sub-generator junction box 1.

A typical actuator, which can be actuated by the PV sub-generator junction box 1 in order, for example, to adjust a PV module 3 in accordance with the respective position of the sun, is labeled by the reference sign 25. The ampere meter symbol entered in the box of the PV sub-generator junction box 1 symbolizes the possible presence of current measurement units in the PV sub-generator junction box 1.

The current measurement units are used to record individual string currents in the PV string lines 2 to which the connected PV modules 3 lead and/or to record an overall PV sub-generator line current.

Five PV modules 3 connected in series into a PV string are shown by way of example in the right-hand part of FIG. 1. The series connection is shown graphically by the offset arrangement of a second PV module 3 in the drawing.

Figure 2:
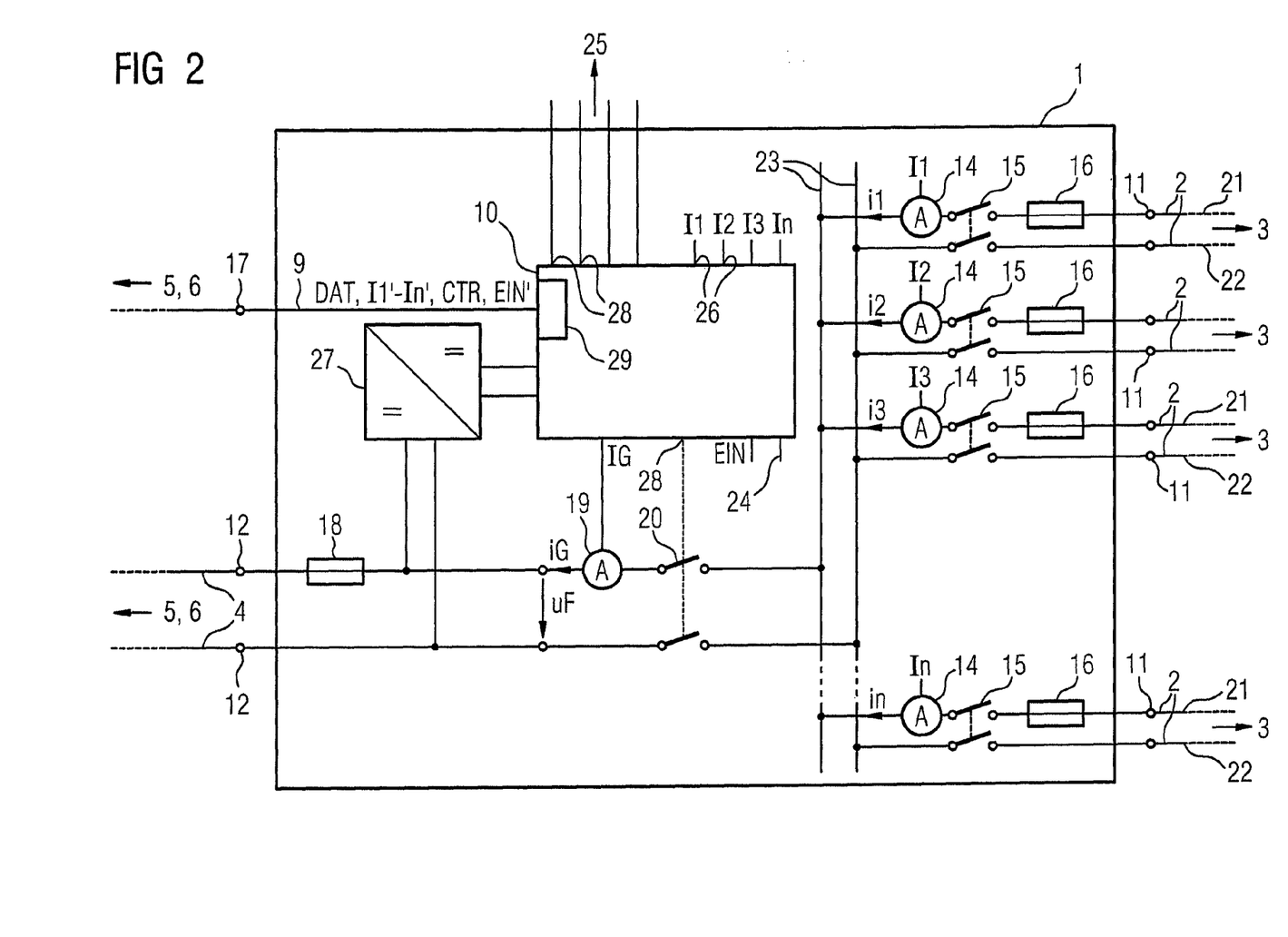
FIG. 2 is an illustration of a PV sub-generator junction box in accordance with prior art.

FIG. 2 shows a prior art PV sub-generator junction box 1. The PV sub-generation junction box 1 depicted typically has four electrical terminals 11 for connecting one PV string line or two PV string lines 2. The reference sign 21 designates a plus conductor and the reference sign 22 a minus conductor of the PV string line 2. In addition, the PV sub-generator junction box 1 shown has a sub-generator line terminal 12 by which the PV sub-generator junction box 1 can be connected to the central PV inverter 5 or to the PV generator junction box 6.

Furthermore, the PV sub-generator junction box 1 features an electronic control unit 10 which has a data connection to the central control unit 7 of the PV inverter 5 for exchanging the data DAT. For this purpose the control unit 10 has a bus connection 29 to which the communication line 9 can be connected. The control unit 10 itself is preferably a microcontroller or a microcomputer. The control unit 10 has electrical outputs 28, to which actuators, such as trackers, or also control magnets of a switching device to be switched can be connected. Here, the electrical outputs 28 are actuated by a corresponding program of the electrical control unit 10. The control unit 10 likewise controls the electrical outputs 28 if a valid control signal (CTR) transmitted as data from the central control unit 7 of the PV inverter 5 is present.

The control unit 10 further typically features four current measurement inputs 26 for recording corresponding string current measurement values I1-In which are transmitted as current measurement data I1'-In' by the communication lines 9 to the central control unit 7 of the PV inverter 5. The string current measurement values I1-In each originate from one current measurement unit 14 which is connected for recording a respective string current i1-in in the respective PV string line 2. Labeled with the reference sign 24 are electrical inputs of the control unit 10 for detecting acknowledgement signals, for example, from a switching device such as of the sub-generator junction box circuit breaker 20, as well as other states to be recorded in the PV sub-generator junction box 1 as input signals EIN. In turn, the corresponding input data EIN' can be output through the communication line 9 to the central control unit 7 of the PV inverter 5.

An optional string circuit breaker 15, as well as a fuse 16 for protecting the respective PV string line 2, are also connected in series to the respective current measurement unit 14. The string circuit breaker 15 shown usually involves a switch that can be actuated manually. The four PV string lines 2 shown are all connected in parallel to a common bus bar 23 which is connected for its part to the PV sub-generator line 4. In the PV sub-generator junction box 1, an optional fuse 18 for group protection, as well as an optional further current measurement unit 19 for recording a cumulative current iG, is connected into the PV sub-generator line 4. A corresponding cumulative current measurement value IG can be recorded by the electronic control unit and further processed in a corresponding way. One of the items of data forwarded over the communication line 9 is current measurement data IG' belonging to the cumulative current measurement value IG. A sub-generator junction box circuit breaker 20 is shown in series with the further current measurement unit 19 which can be activated for group disconnection of the PV sub-generator lines 2 by the control unit 10.

Between the control unit 10 and the PV sub-generator line 4, there is also a power supply comprising a DC/DC converter which converts the high-voltage field voltage UF usually present in the PV sub-generator line 4 into a low voltage for supplying the control unit 10 of the PV sub-generator junction box 1.

As an alternative or in addition, the low voltage can be supplied separately by additional lines.

FIG. 3 is a schematic block diagram of an exemplary PV system 100 in accordance with the invention. Here, the data communication between the central control unit 7 of the PV inverter 5 and the respective PV sub-generator junction box 1 is now undertaken, by contrast with FIG. 1, by one and the same PV sub-generator line 4 or PV main DC power line 4' in each case. To guarantee bidirectional data transmission, a data signal coupler 56 is connected between each of the possible separation points. The respective construction of the PV inverter 5, of the PV generator junction box 6 and also of the PV sub-generator junction box 1 is shown for this figure in detail in the subsequent FIGS. 4 to 6.

Figure 4:
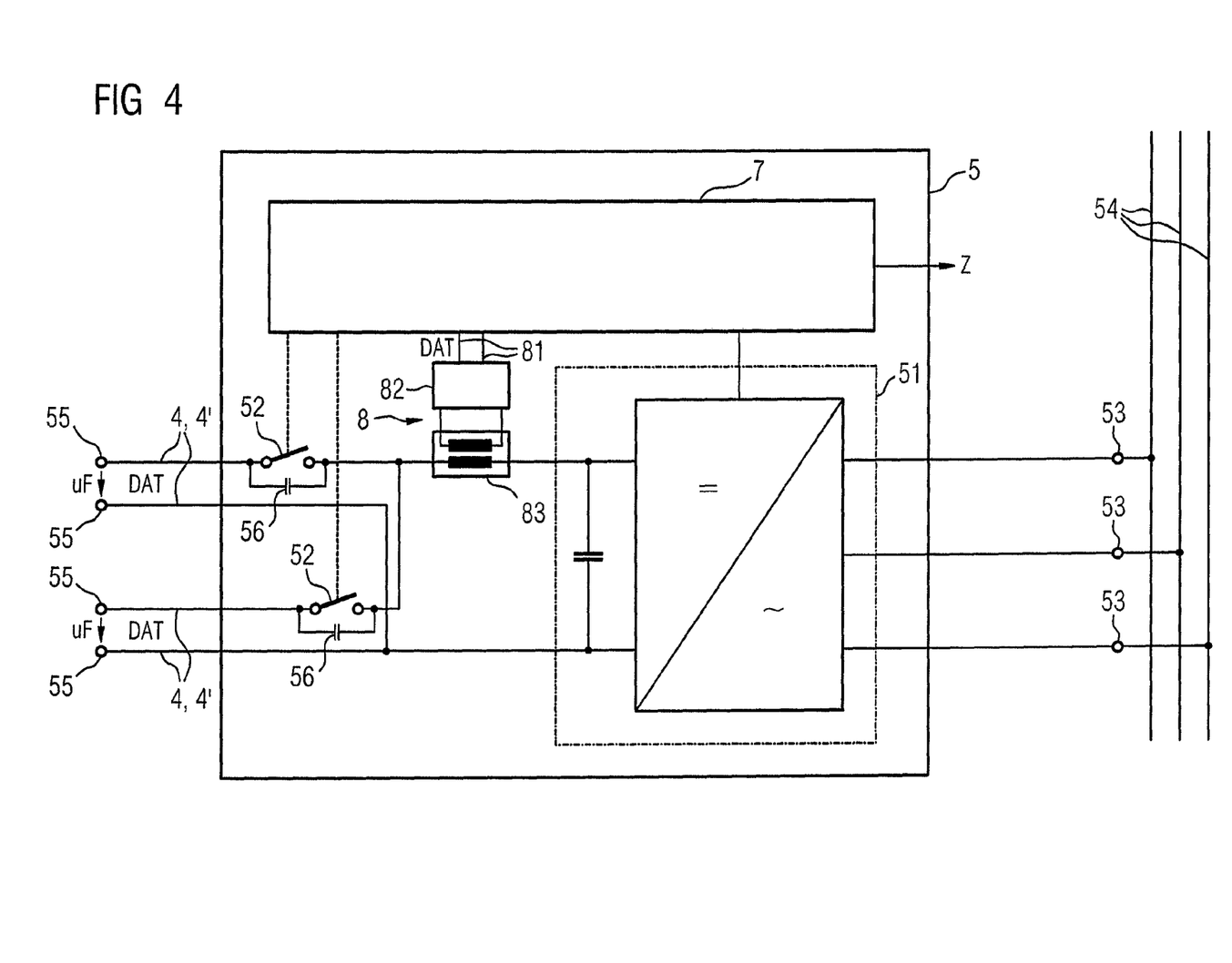
FIG. 4 is an illustration of an exemplary PV inverter in accordance with the invention.

FIG. 4 is an illustration of a schematic block diagram of a PV inverter 5 in accordance with the invention. The PV inverter 5 shown typically features two sub-generator line terminals 55 for connecting a PV sub-generator line 4 for each of a plurality of PV sub-generator junction boxes 1 (not shown in further detail). As an alternative or in addition, a PV main DC power line 4' of an intermediate PV generator junction box 6 can be present at the sub-generator line terminals 55. Furthermore, the PV inverter 5 has a power connection 53 for connecting the PV inverter 5 to a power grid (not shown). Power supply lines are labeled with the reference sign 54. Furthermore, the PV inverter 5 features the central control unit 7 for controlling the PV inverter 5, as well as for transmission of data DAT to a plurality of PV sub-generator junction boxes 1 connected to the central control unit 7 for data communication.

In accordance with the invention, the PV inverter 5 shown has at least one power line modem 8 for feeding and retrieving of the data DAT over the PV sub-generator lines 4 and/or over the PV main DC power lines 4'. The example of FIG. 4 shows only one power line modem 8 present which is connected by a bus connection 81 to the central control unit 7. Labeled with the reference sign 82 is a modem unit for signal processing of the data DAT. Labeled with the reference sign 83 is an example of a transformer by which the data DAT can be coupled in and coupled out on the inductive paths into the PV sub-generator line 4 or into the PV main DC power line 4'. Alternatively, the data DAT can also be coupled in or coupled out on capacitive paths or on resistive paths. Furthermore, the PV inverter 5 typically features two circuit breaker devices 52 for disconnecting the PV sub-generator lines 4 and/or the PV main DC power lines 4'. In accordance with the invention, a data signal coupler 56 comprising a capacitor is also connected in parallel to the two circuit breaker device 52 shown. As a result, the data DAT which is coupled in by the power line modem 8 into the respective PV sub-generator lines 4 and/or in the PV main DC power line 4', can be forwarded even in the open state of the respective circuit breaker device 52. This is the case in the present example in accordance with FIG. 4.

Furthermore, a power section of the PV inverter 5, which converts the array voltage UF present as a high-voltage into a three-phase grid voltage, is labeled with the reference sign 51. Alternatively, the PV inverter 5 can also convert the array voltage UF present on the input side into a single-phase AC voltage.

In the example shown in FIG. 4 the central control unit 7 forms part of the PV inverter 5. A higher-ranking control center or a command center is indicated by the reference sign Z. Higher-level data can be transferred between the command center and the central control unit in both directions. Alternatively, the central control unit 7 of the PV inverter 5 or its functionality can also be arranged outside the PV inverter 5, such as in a process computer of a control center or in an operation and monitoring device. Here, the central control unit can be connected by a data connection, such as by an Internet or intranet connection, to the PV inverter 5. Data can be transmitted by wire or wirelessly, such as via an Ethernet line or by means of WLAN, for example.

FIG. 5 is an illustration of an exemplary PV sub-generator junction box 1 in accordance with the invention. Here, compared to the example shown in FIG. 2, the PV sub-generator has a power line modem 8 in place of the communication line 94 for feeding and retrieving the data DAT over the PV sub-generator line 4. Here, the power line modem 8 and the control unit 10 are connected to each other by a bus connection 81. In the example shown in FIG. 5, the data is fed into and retrieved from the PV sub-generator line 4 or into the PV main DC power line 4' likewise on inductively-coupled paths. In a corresponding manner, the current measurement data I1'-In, IG corresponding to the string currents i1-in can be transmitted as data DAT over the power line modem 8 to the central control unit 7 of the PV inverter 5. In a similar manner, the input data EIN' corresponding to the input signals EIN is able to be transmitted by the power line modem 8 to the central control unit 7. Conversely, the data DAT able to be received or received from the central control unit 7 of the PV inverter 5 by the power line modem 8 can include control data CTR which corresponds to activation signals for activating a switching device 16, 20 of the PV sub-generator junction box 1 and/or of actuators 25 for the PV modules 3. The control unit 10 can also have further digital and/or analog outputs by which switching elements, such as actuators, (not identified any further here) can be activated.

Figure 6:
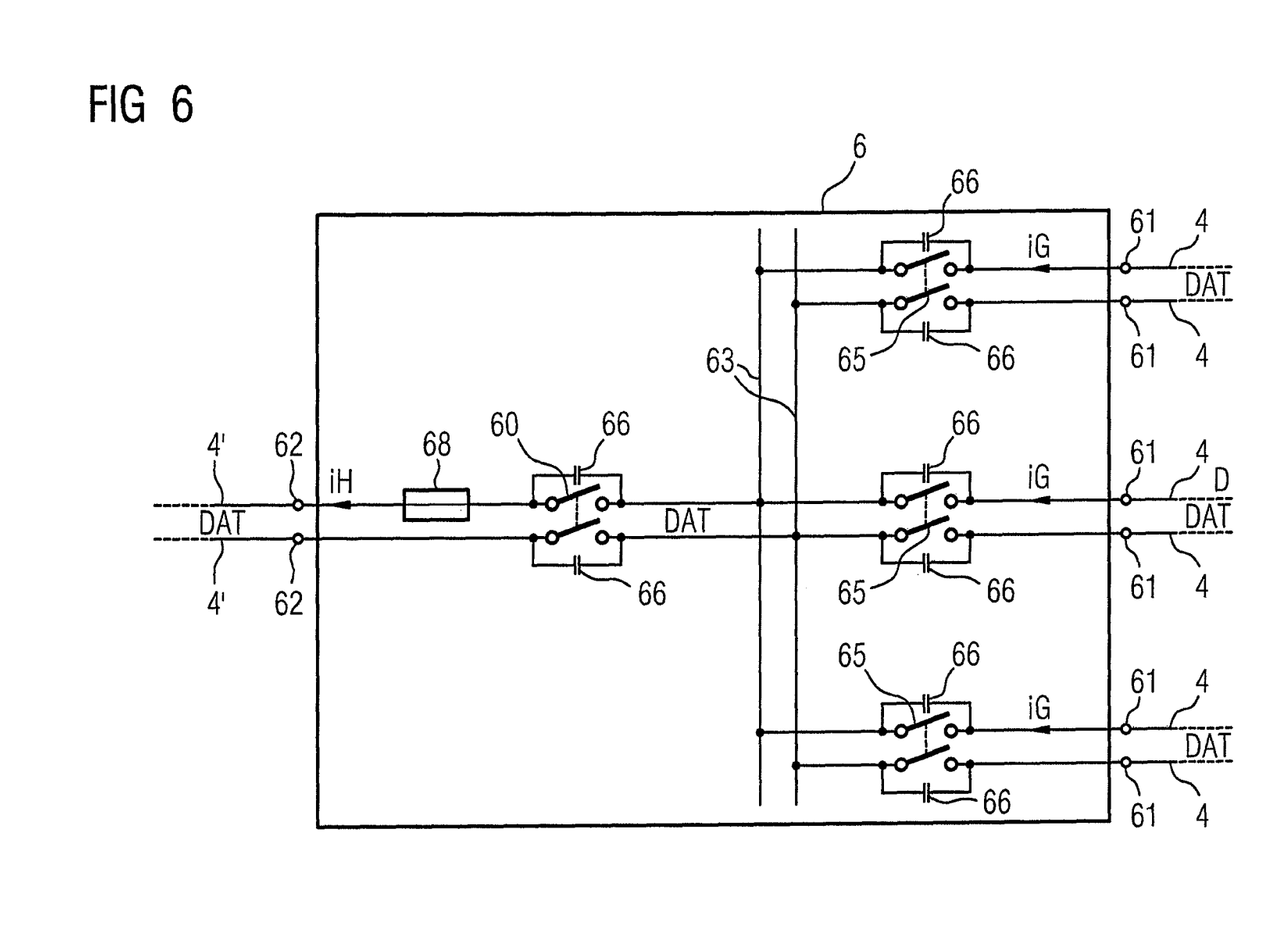
FIG. 6 is an illustration of an exemplary generator junction box in accordance with the invention.

FIG. 6 is an illustration of an exemplary PV generator junction box 6 in accordance with the invention. The PV generator junction box 6, in the example shown in FIG. 6, has three sub-generator line terminals 61 for connecting a PV sub-generator line 4 of a PV sub-generator junction box 1 in each case. The PV generator junction box 6 further features a main DC power line terminal 62 for connecting a PV main DC power line 4', i.e., a remote central PV inverter 5. The PV generator junction box 6 typically features a main circuit breaker 64 for disconnecting the PV main DC power line 4' and/or a cumulative circuit breaker 65 in each case for disconnecting the PV sub-generator lines 4 shown.

In accordance with the invention, a data signal coupler 66 is connected in parallel to the respective circuit breakers 60, 65 so that data DAT which is fed into the respective PV sub-generator lines 4 and into the PV main DC power line 4' is also able to be forwarded in the opened state of the respective circuit breaker 60, 65. In the example shown in FIG. 6, the data signal coupler 66 is a capacitor. There is also a main collective current labeled with the reference sign iH and a fuse for protecting the PV main DC power line 4' labeled with the reference sign 68. Also included is a bus bar 63 to which the PV sub-generator lines 4 are connected in parallel and which is switched to the PV main DC power line 4'. As shown in FIG. 6, forwarding of data signals as a carrier of the data DAT through the respective circuit breaker points of the circuit breakers 60, 65 is possible in both directions, i.e., from left to right and also from right to left.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A photovoltaic (PV) sub-generator junction box for a PV system, comprising:
   a plurality of electrical terminals for connection to respective PV string lines of at least one series-connected PV module; and
   a sub-generator line terminal for connection to a remote central PV inverter;
   an electronic control unit connected for data communication to a central control unit within the remote central PV inverter for exchange of data;

wherein the PV sub-generator line is configured to deliver power received from respective PV string lines to the remote central PV inverter; and a power line modem configured to transmit and receive the data over the PV sub-generator line that delivers power;

wherein the electronic control unit includes at least one electrical output for activating at least one switching device of the PV sub-generator junction box, and wherein the data receivable from the central control unit within the PV inverter by the power line modem comprises corresponding control data.

2. The PV sub-generator junction box as claimed in claim 1, further comprising:

at least one current measurement unit for measuring at least one of a string current of a respective one of the PV string lines and a cumulative string current of the PV string lines;

wherein the data transmittable to the central control unit of the remote central PV inverter by the power line modem contains corresponding current measurement data.

3. The PV sub-generator junction box as claimed in claim 1, wherein the electronic control unit includes at least one electrical input for recording input signals, and wherein the data transmittable to the central control unit of the remote central PV inverter by the power line modem contains corresponding input data.

4. A photovoltaic (PV) generator junction box for a PV system, comprising:

a plurality of sub-generator line terminals for connection to respective PV sub-generator lines of PV sub-generator junction boxes;

a main DC power line terminal for connecting a PV main DC power line of a remote central PV inverter;

at least one of a main circuit breaker for disconnecting the PV main power line and a collective circuit breaker for disconnecting a respective one of the PV sub-generator lines; and a data signal coupler connected in parallel to a respective circuit breaker of the at least one of the main circuit breaker and the collective circuit breaker, so that data to be transferred between the respective PV sub-generator line and the PV main DC power line is also able to be forwarded through the data signal coupler when the respective circuit breaker is in an open state.

5. A photovoltaic (PV) inverter for a PV system, comprising:

a PV main DC power line terminal for connection to at least one of a respective PV sub-generator line terminal of a plurality of PV sub-generator junction boxes, wherein each PV sub-generator line terminal is configured to provide power received at a respective PV string line to a power supply grid;

a grid connection for connecting the PV inverter to the power supply grid, a central control unit for controlling the PV inverter and for transmitting data to the plurality of PV sub-generator junction boxes and/or the intermediate PV generator junction box connected for data transmission to the central control unit; and at least one power line modem coupled to the central control unit for transmitting and receiving the transmitted data over the PV main DC power line that delivers power.

6. The PV inverter as claimed in claim 5, further comprising:

at least one circuit breaker device for interrupting receipt of power at the PV main DC power line terminal;

wherein a data signal coupler is connected in parallel to the at least one circuit breaker device so that data fed by at least one power line modem into at least one of the respective PV sub-generator lines and the PV main DC power line can be forwarded during an open state of the at least one circuit breaker device.

7. A photovoltaic (PV) system, comprising at least one central PV inverter and a plurality of PV sub-generator junction boxes, the PV sub-generator junction boxes comprising:

a plurality of electrical terminals for connection to respective PV string lines of at least one series-connected PV module;

a sub-generator line terminal configured to provide power received from respective PV string lines to the remote central PV inverter over a connection path; and a first power line modem configured to transmit and receive data over the PV sub-generator line terminal, the PV inverter comprising:

at least one main DC power line terminal connected to the sub-generator line terminal of at least one of the plurality of PV sub-generator junction boxes over the connection path;

a second power line modem configured to transmit and receive data over the entire connection path for communication with the first power modem of at least one of the plurality of PV sub-generator junction boxes.

8. The PV system as claimed in claim 7, wherein the connection path comprises at least one circuit breaker for disconnecting the central PV inverter from at least one of the plurality of PV sub-generator junction boxes, a data signal coupler connected in parallel to the circuit breaker so that the communication between the central PV inverter and the respective PV sub-generator junction boxes is maintainable when the circuit breaker is in an open state.

9. The PV system as claimed in claim 8, wherein the circuit breaker is operable based on data transmitted by one of the first and second power modem.

10. The PV system as claimed in claim 7, wherein the connection path comprises a PV generator junction box comprising a plurality of sub-generator line terminals for connection to respective sub-generator line terminals of the plurality of PV sub-generator junction boxes;

a main DC power line terminal for connection to a PV main DC power line of a remote central PV inverter; and at least one of a main circuit breaker for disconnecting the PV main power line terminal and a collective circuit breaker for disconnecting a respective one of the sub-generator line terminals, wherein a data signal coupler is connected in parallel to the respective circuit breaker of the at least one of the main circuit breaker and the collective circuit breaker, so that data fed over the connection path is able to be forwarded through the data signal coupler when the respective circuit breaker is in an open state.

* * * * *